United States Patent [19]

Pingry

[11] Patent Number: 4,840,019
[45] Date of Patent: Jun. 20, 1989

[54] DISC MOWER

[75] Inventor: Larry J. Pingry, Celina, Ohio

[73] Assignee: Allied Products Corporation, Chicago, Ill.

[21] Appl. No.: 104,821

[22] Filed: Oct. 2, 1987

[51] Int. Cl.$^4$ .................. A01D 34/66; A01D 67/00
[52] U.S. Cl. ......................................................... 56/13.6
[58] Field of Search ................................... 56/13.6, 6

[56] References Cited

U.S. PATENT DOCUMENTS

| | | |
|---|---|---|
| 65,809 | 1/1982 | van der Lely et al. |
| 2,059,236 | 3/1980 | van der Lely et al. ............ 56/13.6 |
| 3,070,938 | 1/1963 | Wingiet ................................ 56/13.6 |
| 3,469,378 | 9/1969 | Heesters et al. ..................... 56/13.6 |
| 3,950,923 | 4/1976 | Martensen et al. ..................... 56/6 |
| 3,974,630 | 8/1976 | van der Lely ........................ 56/295 |
| 4,227,365 | 10/1980 | van der Lely et al. ............ 56/13.6 |
| 4,304,088 | 12/1981 | Werner ................................ 56/13.6 |
| 4,365,462 | 12/1982 | Werner et al. ..................... 56/13.6 |
| 4,466,938 | 8/1984 | Sasaki ................................. 56/13.6 |
| 4,476,666 | 10/1984 | van der Lely et al. ............ 56/13.6 |
| 4,557,104 | 12/1985 | Toillie et al. ....................... 56/13.6 |
| 4,577,456 | 3/1986 | van der Lely et al. ............ 56/13.6 |
| 4,720,964 | 1/1988 | Ermacora et al. ................. 56/13.6 |

OTHER PUBLICATIONS

Trase literature entitled "Disc Mowers", of New Idea.

Primary Examiner—Paul J. Hirsch
Attorney, Agent, or Firm—Lockwood, Alex, FitzGibbon & Cummings

[57] ABSTRACT

A rotary mowing device is provided, such being of the type including a plurality of rotary cutter units mounted in substantial in-line relationship with each other and in association with a frame assembly in order that the cutter bar assembly is disposed in a folage-cutting relationship with respect to the ground. Included is a cutter bar assembly having a plurality of rotary cutter units mounted in generally alternating manner with a plurality of spacer units. These alternating units are joined together at their respective leading edge portions and trailing edge portions in order to provide a cutter bar assembly that is easily assembled and disassembled for construction, repair and maintenance procedures.

14 Claims, 3 Drawing Sheets

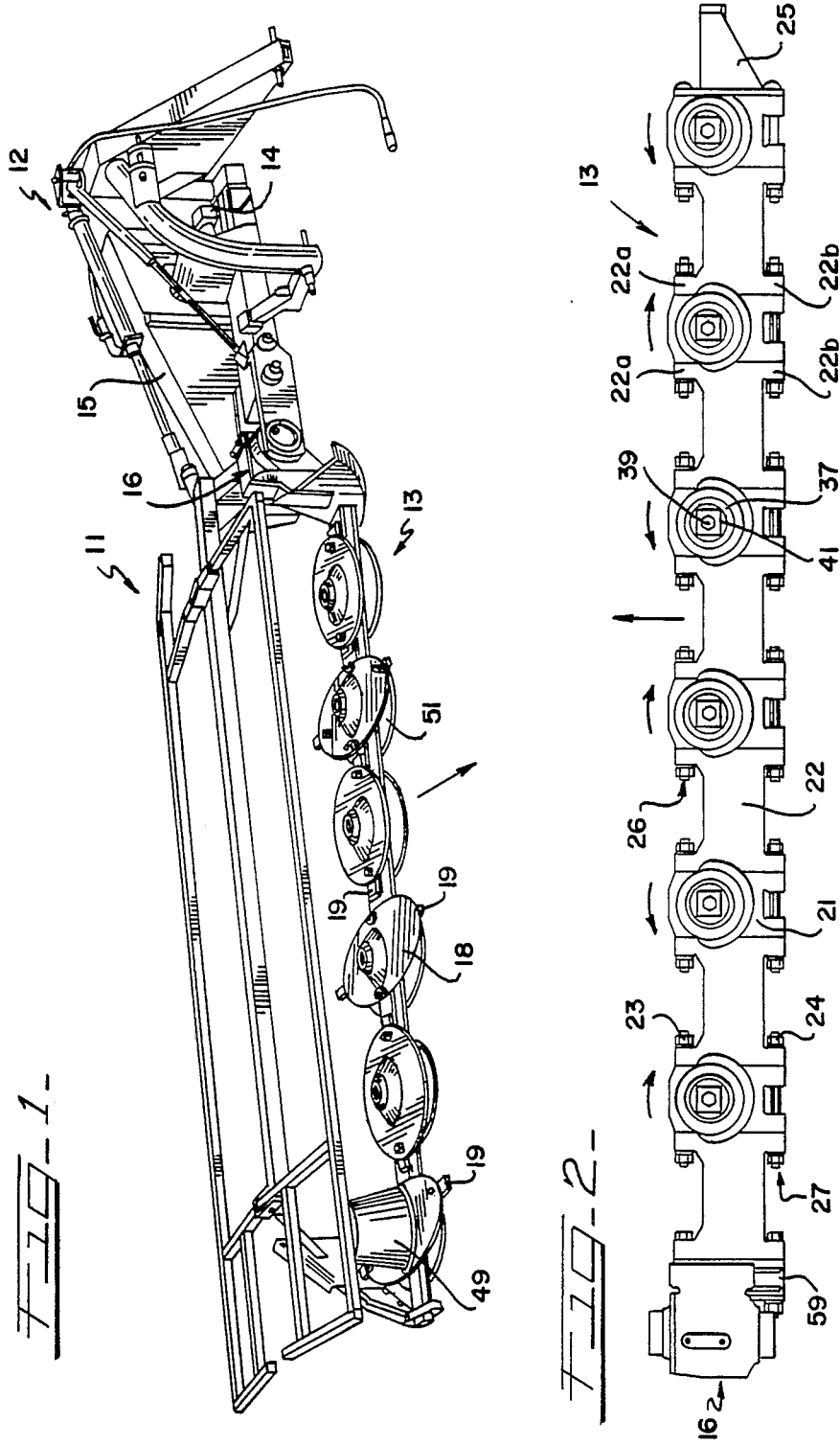

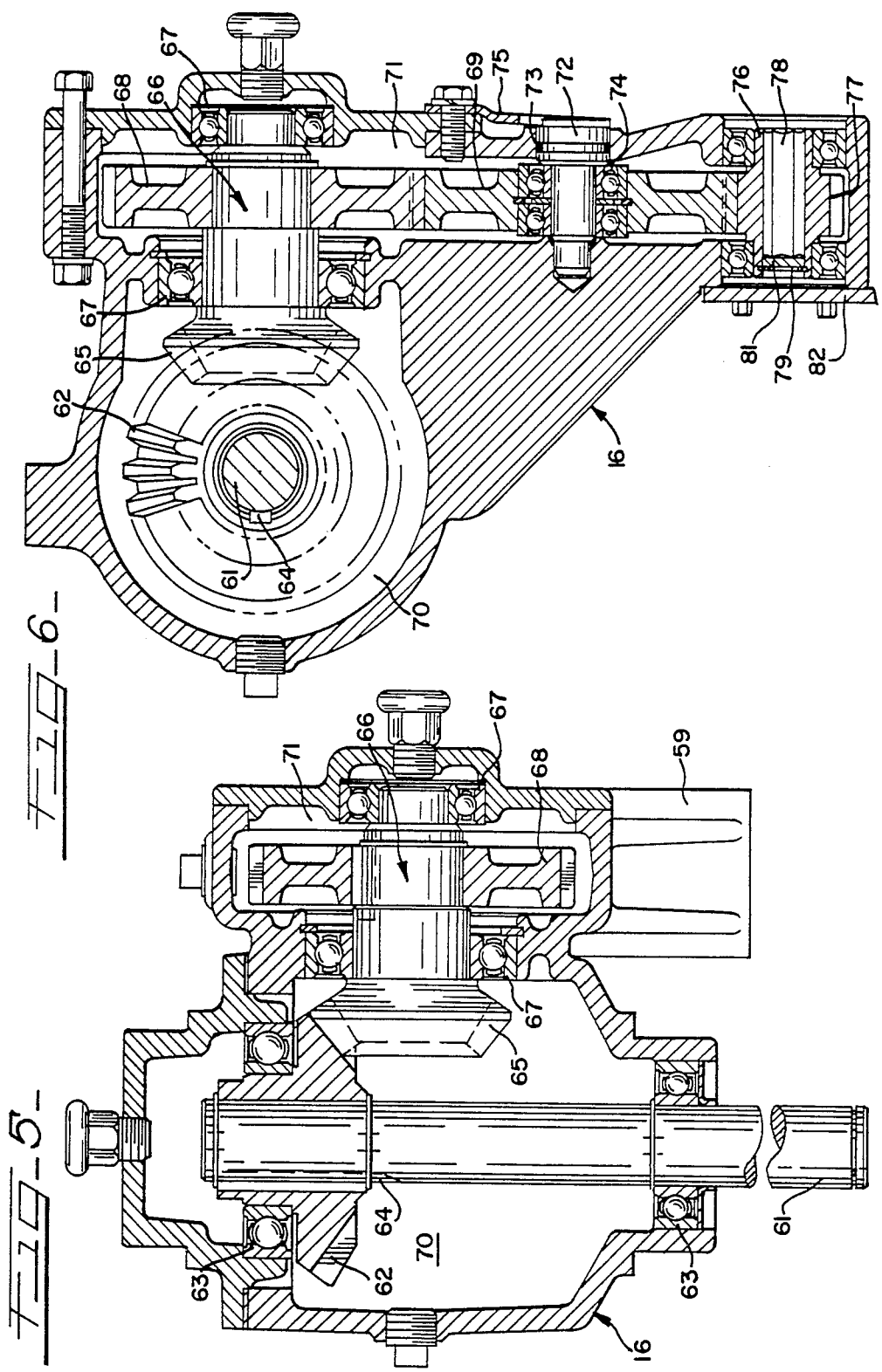

DISC MOWER

BACKGROUND AND DESCRIPTION OF THE INVENTION

The present invention generally relates to disc mowers or rotary mowers having a cutter bar composed of a plurality of assembled segments or units, as well as to a method of assembling same and partially disassembling same for efficient repair or replacement of component parts. More particularly, the invention relates to a rotary mowing apparatus including a cutter bar assembly having a plurality of rotary cutter units mounted in a generally alternating manner with respect to a plurality of spacer units, each adjacent pair of cutter units and spacer units being secured together at their respective leading edge portions and at their respective trailing edge portions by a plurality of securement assemblies. A drive shaft is threaded through the assembled segments and is in driving engagement with each of the rotary cutter units.

In the past, various disc mower or rotary mower devices have been provided or proposed for use in cutting foliage. Such cutting can be carried out in order to harvest the foliage into a form suitable for baling or the like. Such devices can also be used in order to simply cut foliage so as to enhance the appearance of landscaping or to control undesirable growth. Other disc mower devices include conditioning rolls for breaking cut foliage in order to accelerate drying thereof.

Some such disc mower or rotary mower devices incorporate internal oil baths or the like for providing lubrication to moving parts such as gear trains and the like. These types of devices are not particularly suitable for use in mowing terrains that are not substantially horizontal because the oil bath, in seeking its lowest level, will tend to drain from drive components and the like that are elevated with respect to the remainder of the device, thereby exposing the thus improperly lubricated components to excessive wear and possible breakage. This situation would tend to occur for these types of devices when cutting a hillside, a drainage ditch or the like.

Other mower units have been provided or proposed which include sealed lubrication compartments for assemblies in need of lubrication, such as rotary unit drive gears. Also, in some such devices, lubricants of high viscosities such as greases are utilized, rather than lubricating oils which are more likely to flow. Some such devices are assembled in a manner that requires the disassembly of numerous component parts in order to repair or replace a part that is, for example, not at an end of the cutter bar assembly. In this regard, some disc mower cutter bars include elongated beams around which the cutter assemblies are mounted. Others incorporate an elongated gang bolt or the like around which the cutter assemblies are positioned. In most of these arrangements, if it is desired to, for example, repair a cutter assembly near the center of cutter bar, it is necessary to remove one or more other cutter assemblies from the beam or gang bolt or the like in order to obtain access to the cutter assembly in need of repair or replacement. And, of course, after such repair or replacement has been completed, reassembly of at least all of the removed cutting assemblies and other removed components is necessary. Often, during these repair operations, other cutter assemblies or components also become improperly oriented or loosened from their in-use assembled condition so as to require adjustment and/or reassembly of these further components as well.

Shortcomings and disadvantages of these types are advantageously responded to according to the present invention, which provides a plurality of rotary cutter units, each of which can be of a type in which viscous lubricating materials are sealed therewithin to protect internal components. Each such rotary cutter unit is mounted in substantial in-line relationship with the other rotary cutter units. Spacer units are interposed between otherwise adjacent rotary cutter units so that rotary cutter units and spacer units are mounted in a successive and generally alternating manner. Assembly of adjacent ones of these components is accomplished by a pair of securement members, one generally at a leading edge portion and the other at a generally trailing edge portion of the cutter bar assembly. A plurality of these pairs of leading edge portion and trailing edge portion securement members are then provided along the length of the cutter bar. In this manner, a single pair of securement members can be removed in order to gain access to a particular rotary cutter unit for repair or replacement thereof without having to remove securement members of other rotary cutter units and without having to otherwise disassemble the cutter bar.

It is accordingly a general object of the present invention to provide an improved rotary mowing apparatus and a method for assembling same and partially disassembling same for repairs or the like.

Another object of the invention is to provide an improved rotary mowing apparatus that operates efficiently and safely on flat or on hilly terrain.

Another object of the present invention is to provide an improved apparatus and method for making same, which apparatus has component rotary cutter units that are individually removable from the cutter bar.

Another object of this invention is to provide a disc or rotary mowing apparatus and method for making same, which apparatus can be varied in length by adding or removing rotary cutter units and/or spacer units from the cutter bar.

Another object of this invention is to provide an improved rotary mowing device having a plurality of rotary cutter units mounted in substantial in-line relationship with each other, which rotary cutter units include a blade carrier that is mounted in a simplified manner and that mounts the blades so as to permit their full-circle rotation when deflected during use.

These and other objects, features and advantages of the present invention will be clearly understood through a consideration of the following detailed description.

BRIEF DESCRIPTION OF THE DRAWINGS

In the course of this description, reference will be made to the attached drawings, wherein:

FIG. 1 is a perspective view of a typical rotary mowing device according to the present invention;

FIG. 2 is a plan view of a cutter bar and gearbox assembly according to the present invention, with the blade carriers and blades having been removed for illustrative purposes;

FIG. 5 is a generally horizontal cross-sectional view through a gearbox suitable for inclusion in the driving assembly of a rotary mowing device according to this invention; and FIG. 6 is a generally vertical cross-sectional view through the gearbox that is illustrated in FIG. 5.

DESCRIPTION OF THE PARTICULAR EMBODIMENTS

With particular reference to FIG. 1, a rotary mowing device is illustrated which includes a frame assembly, generally designated as 11, a mounting assembly associated therewith, generally designated as 12, and a cutter bar assembly, generally designated as 13. Frame assembly 11 will typically support cover means such as a protective curtain. The illustrated mounting assembly 12 is suitable for securely attaching the rotary mowing device to a tractor or other mobile power source (not shown) in a generally conventional manner that will be understood by the skilled artisan. The direction of movement of the rotary mowing device is indicated by the arrow in FIG. 1 and by the vertical arrow in FIG. 2. Such movement is generally along the ground and at a height that is suitable for the cutting or mowing of foliage in a manner that is well appreciated in the art.

Figure 3:
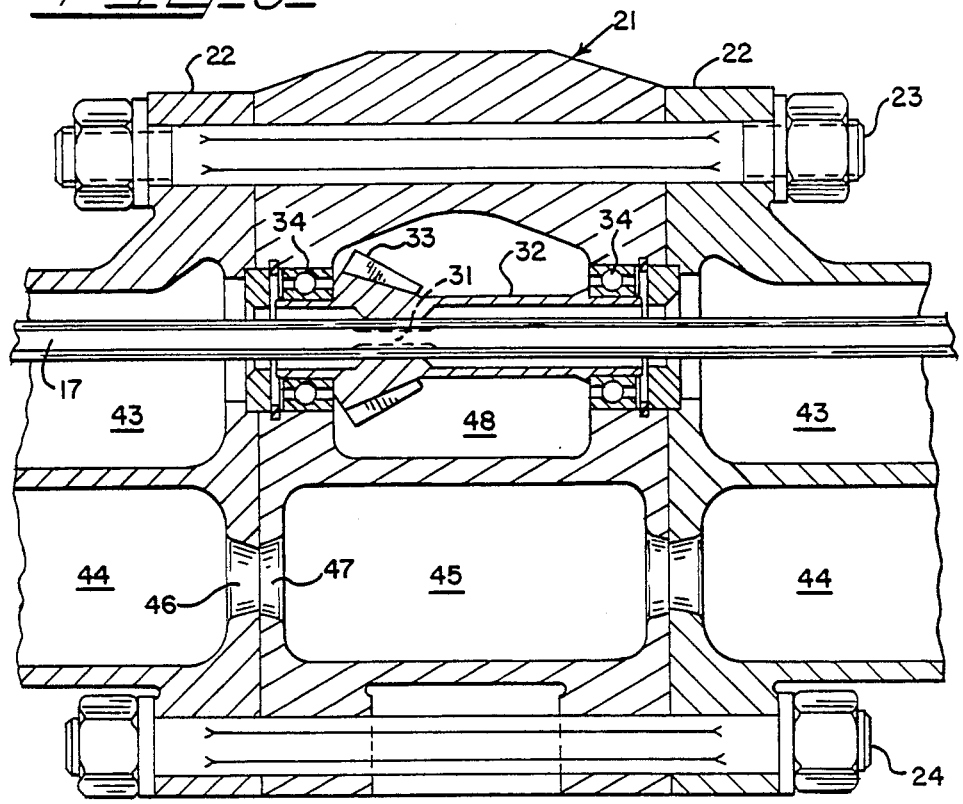
FIG. 3 is a generally horizontal sectional view of a portion of the cutter bar assembly according to this invention.

A housing 14 for receiving a transfer drive shaft assembly from the tractor or the like is included in the illustrated mounted assembly 12 in order to input mechanical power to the device. Rotation of this transfer drive shaft assembly effects rotation of a drive means such as a belt or chain within a drive enclosure 15 in order to transmit power to a gearbox 16 in a manner that will be appreciated by those skilled in art. Gearbox 16 then transmits the thus inputted power to a drive shaft 17 (FIG. 3) within the cutter bar assembly 13 in order to rotate each blade carrier 18 having blades 19 mounted thereon. The blades 19 carry out the foliage cutting function of the rotary mowing device by such rotation of the blade carriers 18. Blade carriers 18, which are substantially non-flexible and non-resilient, are typically made of 7 gauge steel or a comparable material. Blade carrier 18 assists in deflecting the foliage being cut so that it will readily flow over the top of the cutter bar 13. If desired, blade carriers 18 can include, on the top surface thereof, upstanding fins or the like (not shown) in order to even further enhance the deflection and flow of cut foliage, such being especially advantageous in mower-conditioner devices.

Cutter bar assembly 13 is constructed of a plurality of rotary cutter units 21 that are secured, in a substantially alternating manner, to a plurality of spacer units 22. Securement of the rotary cutter units 21 and the spacer units 22 into the cutter bar assembly 13 is achieved by pairs of securement members 23, 24 in order to readily attach the cutter units and spacer units to each other in a manner that will withstand the forces and stresses that are encountered by a working rotary mowing device. No additional means such as full length beams, gang bolts and the like are needed to give the cutter bar the structural integrity required of cutter bars in these types of devices. The illustrated securement members are nut and bolt assemblies, each bolt thereof passing through a bore along an edge portion of a rotary cutter unit 21 and through axially aligned bores within opposing mounting ears 22a, 22b that transversely project from each spacer unit 22. Access to any one of the rotary cutter units 21 is greatly facilitated by providing, as illustrated, a plurality of these pairs of securement members 23, 24. This is accomplished by loosening the nuts, for example, of both components of only one of the pairs of securement members 23, 24. In this manner, the selected rotary cutter unit 21 is completely disassembled from each spacer unit 22 (or similar structure such as an extension unit 25 at the remote end of the cutter bar assembly 13) which flanks the particular rotary cutter unit 21. After suitable simple sliding movement between of the drive shaft 17 and the rest of the cutter bar, if necessary, the selected rotary cutter unit 21 is fully removable from the cutter bar assembly 13 for repair or replacement of this particular rotary cutter unit 21.

Each securement member 23 is mounted substantially along a leading edge portion, generally designated as 26, of the cutter bar assembly 13. The other securement member 24 of each securement member pair is substantially mounted along a trailing edge portion, generally designated as 27, of the cutter bar assembly 13. This positioning along the substantially opposing edge portions of the cutter bar assembly 13 enhances the accessibility of the securement members 23, 24 and facilitates their removal when maintenance, repair or replacement is necessary.

Drive shaft 17 is a single piece of elongated bar stock that is of a length suitable for the number of rotary cutter units 21 and spacer units 22 to be assembled into the cutter bar assembly 13. Because of the structure of the cutter bar assembly 13, a unitary drive shaft 17 can be used in order to reap the benefits of a non-segmented drive shaft, including strength, structural integrity, simplicity and reduced cost.

With more particular reference to the driving engagement between the drive shaft 17 and each of the rotary cutter units 21, the drive shaft 17 includes means for engaging a straight bevel gear 28 or the like which is secured to a vertical stub shaft 29 to which the blade carrier 18 is secured. The illustrated manner by which the drive shaft 17 is in driving engagement with the straight bevel gear 28 utilizes the drive shaft having at least one flattened surface portion, the illustrated shaft 17 having a hexagonal configuration throughout its length. This flat-containing surface is in mating engagement with an inside surface portion 31 of a sleeve assembly 32, such inside surface portion 31 having a shape that is complementary with the flat surface portion of the drive shaft 17. In the illustrated embodiment, the inside surface portion 31 is hexagonal in cross-section. Thus, when the cutter bar assembly 13 is fully assembled, the sleeve assembly 32 rotates with the drive shaft 17. Sleeve assembly 32 includes an external straight bevel gear facing 33 which is in meshing engagement with the straight bevel gear 28. Sleeve assembly 32 is rotatably mounted, such as by way of the sealed and lubricated bearing assemblies 34 that are all well above the drive shaft 17.

Each rotary cutter unit 21 includes a bearing housing 35 which holds bearing assemblies 36 for the rotatable mounting of a mount 37 to which the vertical stub shaft 29 is secured. The blade carrier 18 is positioned between this mount 37 and a pressure block 38, and this assembly is secured together by suitable means such as the illustrated locknut 39. As can be seen in FIG. 2, from which each blade carrier 18 and pressure block 38 have been removed, the mount 37 includes flats, such as the illustrated square boss 41. Such boss 41 is received in a complementarily shaped opening 42 within the blade carrier 18. No dish-shaped top plates above the blade carrier 18 are required. This arrangement provides a simplified mounting assembly, by virtue of which a blade carrier 18 can be readily removed for repair or replacement by simply removing the locknut 39 and the pressure block 38 thereunder.

Each rotary cutter unit 21 and spacer unit 22 preferably includes hollow areas as shown in order to reduce the weight of the cutter bar assembly 13. Hollow areas 43, 44 and 45 are included, with the formation of same being facilitated by casting holes 46, 47. Viscous lubricant such as grease will typically be within hollow portion 48 in order to provide lubrication for the rotary cutter unit 21.

In a manner well appreciated in the art, alternate cutter bar assemblies have opposing directions of rotation as illustrated by the arrows in FIG. 2. This enhances the cutting action of the cutter bar assembly 13. A high hat cover 49 is typically secured to the outermost cutter bar assembly 13 in order to provide crop division between the cut crop and the uncut crop in a manner that is well appreciated in the art. In order to provide overlapping cutting surfaces, alternating blade carriers 18 are mounted at 90 degrees with respect to each other, and the distance between the ends of opposing blades 19 on each blade carrier 18 is of a length such that each blade 19 extends beyond the midpoint of the distance between adjacent rotary cutter units 21. With this arrangement, blades of adjacent rotary cutter units 21 define respective swath paths that overlap one another. The provision of this overlapping blade arrangement is facilitated by the generally oval shape of the blade carriers 18 in order to provide a greater measure of clearance between a rotating blade and each adjacent blade carrier with which it is 90 degrees out of phase. Blade guards 51 typically will also be included in order to reduce undesirable contact between the blades 19 and the ground or degree thereon.

Figure 4:
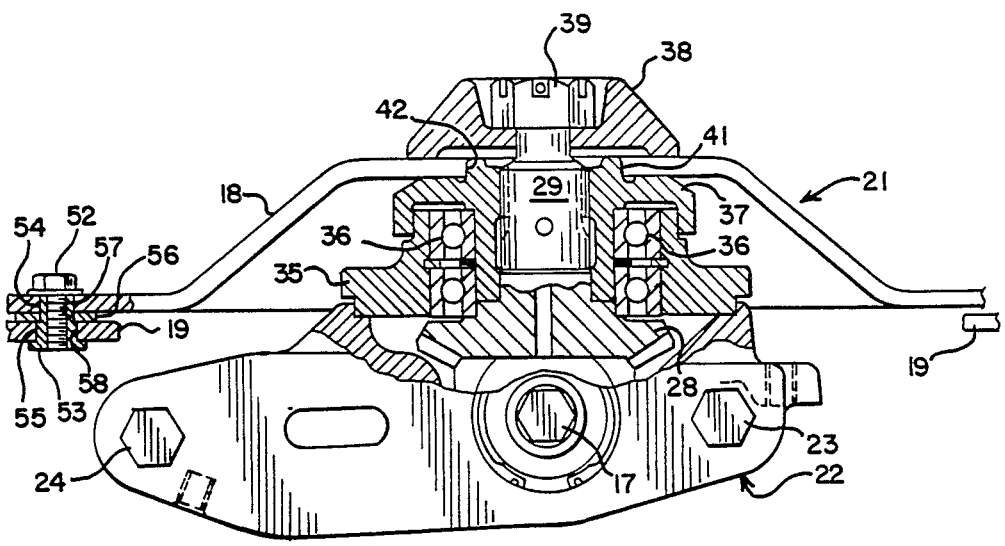
FIG. 4 is a partial, cross-sectional view of the cutter bar assembly, particularly illustrating a rotary cutter unit.

The preferred assembly of each blade 19 onto the blade carrier 18 is illustrated in FIG. 4. Included are a blade bolt 52 which threadedly engages a blade nut 53 having a longitudinally extending flat 54 positioned above a cylindrical rotation surface 55. A blade washer 56 having a slot 57 that matingly engages the longitudinally extending flat 54 of the blade nut 53 is interposed between the blade carrier 18 and the blade 19. When thus assembled, the blade bolt 52, the blade nut 53, and the blade washer 56 are mounted in a stationary, nonrotatable manner, while the blade 19 is rotatably mounted thereby. Rotational movement of the blade 19 includes rotational engagement of the cylindrical rotation surface 55 and a cylindrical hole 58 in the blade 19. Preferably, this blade mounting arrangement permits a full 360 degree rotation of the blade 19 when same engages an obstacle during use so that the blade will rotate away from such obstacle and minimize damage to the blade 19.

The gearbox illustrated in FIG. 5 and in FIG. 6 provides a description of a preferred gearbox portion of the drive means which is suitable for mower or windrower applications. The gearbox would have to be modified, or additional drive means would have to be provided, when the rotary mowing device is a mower conditioner. This additional drive means is needed in order to drive horizontally mounted conditioning rollers (not shown) that are mounted behind and typically above cutter bar assemblies in a manner that is generally appreciated in the art.

With further reference to the illustrated gearbox 16, an end plate 59 is provided for attachment of the cutter bar assembly 13 thereto in a manner generally shown in FIG. 2. Input to the gearbox 16 is provided typically by suitable drive means such as a belt or chain within the drive enclosure 15, the rotation of such drive assembly being effected by power provided from a mobile power source, such as the power take-off assembly of a tractor or the like in a manner generally discussed hereinabove. Standard power sources in this regard are on the order of 540 rpm. By the driving arrangement of the present device, this will translate into a rotational speed of each blade carrier 18 of 3030 rpm. In a typical arrangement, a sheave (not shown) is secured to an input shaft 61 that projects from the gearbox 16 in order to transmit the power into the gearbox 16.

A bevel gear 62 is secured onto the input shaft, which is rotatably mounted by suitable bearing assemblies 63, such as those of the illustrated shield-bearing type. A square key 64 can be provided to assist in securing the bevel gear 62 to the input shaft 61. The input bevel gear 62 meshes with a bevel gear 65 of a pinion assembly, generally designated as 66. The bevel gears 62, 65 are within a bevel gear compartment 70, which is typically filled with grease or similar lubricant.

Pinion assembly 66 is mounted by suitable bearings 67 as shown or the like. A spur gear member 68 is secured onto the pinion assembly 66, which in turn drives an intermediate spur gear 69. A spur gear compartment 71 encloses this spur gear assembly, such typically being packed with grease or the like. Preferably, the intermediate spur gear 69 is bearing mounted in the manner generally illustrated, which includes a shaft idler 72, an O-ring 73, a bearing assembly 74, and a bolted down clip 75.

Intermediate spur gear 69 is in driving engagement with a spur gear sleeve assembly 76 which includes an external spur gear surface 77 and an inside, flatted surface 78, such as the illustrated hexagonal surface. Inside flatted surface 78 should be shaped and sized so as to be complementary, and able to provide mating engagement, with the drive shaft 17 which is slidable thereinto. The drive shaft 17 is mounted in such a manner that same is readily slidable either away from or through the inside flattened surface 78. Containment means are provided in order to prevent undesired sliding movement of the drive shaft 17 in a direction outwardly of the cutter bar assembly 13 (to the left in FIGS. 2 and 6). The illustrated containment means includes a snap ring groove housing a snap ring 79 which holds a stop member 81 in place. Preferably, a containment plate 82 is bolted thereover, and such containment plate 82 can have a suitable skid structure downwardly depending therefrom.

A similar containment means such as a snap ring mounting arrangement (not shown) is provided at the other end of the mounted drive shaft, such containment means being generally within the rotary cutter unit 21 that is farthest from the gearbox 16. The extension unit 25 covers this containment means and can, if desired, assist the function of the containment means to prevent outward movement (to the right as shown in FIG. 2) of the drive shaft 17.

With more specific reference to assembly and disassembly procedures, the preferred cutter bar assembly method involves simply selecting the number of rotary cutter units 21 and spacer unit 22 that are needed to form a cutter bar assembly 13 of a desired length and then joining them together in an alternating manner with pairs of the securement members 23, 24. Thereafter, the drive shaft 17 of the correct length is slid into and through the cutter bar assembly 13, and suitable containment means are secured in place as needed. Alternatively, it is possible to modify this assembly procedure by sliding the drive shaft 17 into each rotary cutter unit 21 as it is secured to the cutter bar being assembled. It is to be emphasized that this alternative assembly procedure is not at all required inasmuch as the preferred assembly procedure is easily and efficiently accomplished.

Regarding disassembly for maintenance, repair or replacement purposes, the present invention makes possible a simple disassembly procedure in which there is no need to disassemble any rotary cutter units 21 from spacer units 22 except for the particular rotary cutter unit 21 that is in need of service. In the preferred partial disassembly procedure, only the pair of securement members 23, 24 that engage the rotary cutter unit 21 to be serviced are removed. With one end of the cutter bar assembly 13 free to move longitudinally, such as by removal of the means by which the extension assembly 25 is mounted to the frame assembly 11, the portion of the cutter bar assembly which is between same and the unsecured rotary cutter unit 21 is slid off so as to permit the unsecured rotary unit to be likewise slid off. Then, when replacement is in order, a fresh rotary cutter unit 21 is secured to the adjoining spacer unit 22, and the rest of the cutter bar assembly that had been previously removed is secured to this fresh rotary cutter unit 21.

An alternative partial disassembly procedure is possible. In this procedure, one of the drive shaft containment assemblies, such as the containment plate 82, the snap ring 79 and the stop member 81, are removed so that the drive shaft 17 can be slid outwardly until it disengages the bevel gear sleeve assembly 32 of the rotary cutter unit 21 to be serviced. In addition, the pair of securement members 23, 24 which engage the cutter unit 21 to be serviced are removed. This completely disengages this rotary cutter unit 21 from the cutter bar.

It will be understood that the embodiments of the present invention which have been described are illustrative of some of the applications of the principles of the present invention. Numerous modifications may be made by those skilled in the art without departing from the true spirit and scope of the invention.

I claim:

1. A rotary mowing device having a plurality of rotary cutter units mounted in substantial in-line relationship with each other, said rotary mowing device comprising:
   a frame assembly having means for supporting a longitudinal cutter bar assembly in foliage-cutting relationship with respect to the ground, said cutter bar assembly having opposing end portions and an interior portion therebetween;
   a mounting assembly having means for securing said frame assembly to a source of rotational power;
   drive means for transmitting the rotational power to said cutter bar assembly;
   said cutter bar assembly including a plurality of rotary cutter units mounted in a generally alternating manner with a plurality of spacer units, a drive shaft passing through said rotary cutter units and said spacer units, said drive shaft being in driving engagement with each of said rotary cutter units;
   said cutter bar assembly having a leading edge portion defined by successive leading edge portions of said rotary cutter units and of said spacer units;
   said cutter bar assembly having a trailing edge portion defined by successive trailing edge portions of said rotary cutter units and of said spacer units;
   a plurality of leading edge securement means for joining the leading edge portion of each rotary cutter unit to the leading edge portion of each spacer unit adjacent thereto;
   a plurality of trailing edge securement means for joining the trailing edge portion of each rotary cutter unit to the trailing edge portion of each spacer unit adjacent thereto;
   each said leading edge securement means and each said trailing edge securement means of said interior portion of the cutter bar assembly secures a rotary cutter unit sandwiched between two of said spacer units, wherein said leading edge securement means joins an ear portion of one of said spacer units and an ear portion of the other of said two spacer units to opposite transverse ends of a leading edge portion of said sandwiched rotary cutter unit, whereby said leading edge securement means is located within said leading edge portion of the sandwiched rotary cutter unit.

2. The rotary mowing device according to claim 1, wherein each of said plurality of leading edge securement means engages only one of said rotary cutter units, and wherein each of said trailing edge securement means engages only one of said rotary cutter units.

3. The rotary mowing device according to claim 1, wherein said drive shaft is a substantially unitary member.

4. The rotary mowing device according to claim 1, wherein said drive shaft drivingly engages a sleeve assembly having an external straight bevel gear, said sleeve assembly being rotatably mounted in a rotary cutter unit.

5. The rotary mowing device according to claim 1, wherein said rotary cutter units each include a blade carrier having at least one blade mounted generally at an end thereof, said blade carrier being rotatably mounted onto a top portion of the rotary cutter unit by a mounting assembly including a pair of opposing mounts that are secured together.

6. The rotary mowing device according to claim 1, wherein said rotary cutter units each include a blade carrier having at least one blade rotatably mounted at an end thereof by a mounting assembly, said blade carrier including a slot, said mounting assembly including a blade nut in threaded engagement with a blade bolt having a longitudinally extending flat surface and a cylindrical rotation surface, said longitudinally extending flat surface being in non-rotatable engagement with said slot of the blade carrier, and said cylindrical rotation surface of the blade bolt is in rotatable engagement with a mounting opening through said blade.

7. The rotary mowing device according to claim 1, wherein said drive means includes a gearbox having a bevel gear compartment within which are rotatably mounted a driving bevel gear and a driven bevel gear, said driven bevel gear being a component of a pinion assembly that also includes a spur gear member, said gearbox further including a spur gear compartment within which said pinion assembly spur gear is rotatably mounted for driving engagement with a spur gear member for driving said drive shaft.

8. The rotary mowing device according to claim 1, further including removable containment means for preventing longitudinal movement of said drive shaft in a direction outwardly of said cutter bar assembly.

9. A method for assembling a rotary mowing device having a plurality of rotary cutter units mounted in substantial in-line relationship with each other, said assembly method comprising:
providing a plurality of rotary cutter units and a plurality of spacer units, each rotary cutter unit and spacer unit having a leading edge portion and a trailing edge portion;
assembling said rotary cutter units and said spacer units in a generally alternating manner by affixing a securement member for joining a rotary cutter unit to an adjacent spacer unit;
said joining step includes positioning the securement member at the respective leading edge portions of such rotary cutter unit and such spacer unit, and positioning a second securement member at the respective trailing edge portions of such rotary cutter unit and such spacer unit;
proceeding with additional securing steps using pairs of securement members in order to thereby join an additional rotary cutter unit to such spacer unit, and repeating such securing steps until a longitudinal cutter bar assembly having a desired number of rotary cutter units and spacer units has been assembled into a cutter bar assembly having opposing end portions and an interior portion therebetween, wherein by said joining and securing steps each said leading edge securement member and each said trailing edge securement member of said interior portion of the cutter bar assembly secures a rotary cutter unit sandwiched between two of said spacer units, and wherein said leading edge securement member joins an ear portion of one of said spacer units and an ear portion of the other of said two spacer units to opposite transverse ends of a leading edge portion of the sandwiched rotary cutter unit;
inserting a drive shaft through each of the rotary cutter units and sliding the drive shaft through the spacer units and along the full length of the cutter bar assembly, such inserting procedure including positioning an end portion of the drive shaft in driving engagement with a drive means for transmitting rotational power to the cutter bar assembly;
securing one of said opposing end portions of the cutter bar assembly to a frame assembly for supporting the cutter bar assembly in foliage-cutting relationship with respect to the ground; and
providing a mounting and drive assembly and attaching same to the frame assembly in order to thereby provide mounting and drive transmitting capabilities between the rotary mowing device and a mobile source of power.

10. The assembly method according to claim 9, wherein each of said joining steps secures only of said rotary cutter units.

11. The assembly method according to claim 9, wherein each of said inserting steps slidingly inserts a substantially unitary drive shaft.

12. The assembly method according to claim 9, further including mounting a containment member for thereby substantially preventing longitudinal movement of the drive shaft in a direction outwardly of the cutter bar assembly.

13. A method of servicing by partially disassembling and reassembling a rotary mowing device having a plurality of rotary cutter units mounted in substantial in-line relationship with each other, said disassembly method comprising a procedure in which a single rotary cutter unit is removed from a cutter bar assembly, said procedure including:
providing a rotary mower device having a plurality of rotary cutter units and a plurality of spacer units, each rotary cutter unit and spacer unit having a leading edge portion and a trailing edge portion, which rotary cutter units and spacer units are assembled in a generally alternating manner by affixing a securement member joining one edge of an interior rotary cutter unit to an adjacent spacer unit and joining an opposite edge of said interior rotary cutter unit to another adjacent spacer unit, wherein said leading edge securement member of the interior rotary cutter unit joins an ear portion of one of said spacer units and an ear portion of the other of said spacer units to opposite transverse ends of a leading edge portion of the interior rotary cutter unit;
removing a securement member from a leading edge portion of the rotary cutter unit to be serviced and from a leading edge portion of an adjacent spacer unit, and removing a second securement member from a trailing edge portion of such rotary cutter unit and such spacer unit;
dismounting one end of the cutter bar assembly from the rotary mowing device in order to permit a portion of the cutter bar assembly at said end to clear the rest of the rotary mower device;
sliding the thus dismounted end portion of the cutter bar assembly along and off of the drive shaft;
sliding the rotary cutter unit to be serviced along and off of the drive shaft;
substituting another rotary cutter unit by sliding same onto and along the drive shaft;
reinserting the previously dismounted end portion of the cutter bar assembly onto and along the drive shaft by sliding same onto and along the drive shaft;
assembling said another rotary cutter unit and the previously dismounted end portion of the cutter bar assembly to the rest of the cutter bar assembly by positioning a securement member at respective leading edge portions thereof and at respective trailing edge portions thereof; and
remounting the thus reassembled cutter bar assembly on the rotary mowing device.

14. The servicing method according to claim 13, wherein each of said removing step and said assembling step operates on only one of said rotary cutter units.

* * * * *

UNITED STATES PATENT AND TRADEMARK OFFICE
CERTIFICATE OF CORRECTION

PATENT NO. : 4,840,019

DATED : June 20, 1989

INVENTOR(S) : Larry J. Pingry

It is certified that error appears in the above-identified patent and that said Letters Patent is hereby corrected as shown below:

```
Column 3, line 36, insert --the-- after "in".
Column 4, line 12, delete "of".
Column 8, line 16, "thereto;" should read --thereto; and--.
```

Signed and Sealed this

Tenth Day of July, 1990

Attest:

HARRY F. MANBECK, JR.

Attesting Officer

Commissioner of Patents and Trademarks